(12) United States Patent
Boeen et al.

(10) Patent No.: US 7,826,999 B1
(45) Date of Patent: Nov. 2, 2010

(54) MAGNETIC TILT COMPENSATED HEADING COMPASS WITH ADAPTIVE ZOFFSET

(75) Inventors: Anders Boeen, San Rafael, CA (US); Andrew T. Taylor, Santa Rosa, CA (US); Davy J. Figaro, Sebastopol, CA (US)

(73) Assignee: PNI Corporation, Santa Rosa, CA (US)

( * ) Notice: Subject to any disclaimer, the term of this patent is extended or adjusted under 35 U.S.C. 154(b) by 0 days.

(21) Appl. No.: 11/856,973

(22) Filed: Sep. 18, 2007

Related U.S. Application Data

(60) Provisional application No. 60/956,907, filed on Aug. 20, 2007.

(51) Int. Cl.
*G01C 17/02* (2006.01)
*G06F 17/40* (2006.01)

(52) U.S. Cl. .......................... 702/141; 702/85; 702/92; 33/356; 33/352

(58) Field of Classification Search .................. 702/141, 702/85, 92
See application file for complete search history.

(56) References Cited

U.S. PATENT DOCUMENTS

| | | | | |
|---|---|---|---|---|
| 4,539,760 A | * | 9/1985 | Marchent et al. | .............. 33/356 |
| 4,851,775 A | * | 7/1989 | Kim et al. | ................... 324/247 |
| 5,239,264 A | | 8/1993 | Hawks | |
| 5,381,603 A | | 1/1995 | Lee | |
| 5,525,901 A | | 6/1996 | Clymer | |
| 5,953,683 A | * | 9/1999 | Hansen et al. | ................. 702/95 |
| 6,105,265 A | * | 8/2000 | Gloor et al. | ............... 33/355 R |
| 6,243,660 B1 | | 6/2001 | Hsu | |
| 6,285,927 B1 | | 9/2001 | Li | |
| 6,289,268 B1 | | 9/2001 | Didinsky | |
| 6,335,617 B1 | | 1/2002 | Osadchy | |
| 6,549,145 B2 | | 4/2003 | Hsu | |
| 6,836,971 B1 | * | 1/2005 | Wan | ............................ 33/356 |
| 6,842,991 B2 | | 1/2005 | Levi | |
| 6,931,323 B2 | | 8/2005 | Choi | |
| 7,069,663 B2 | * | 7/2006 | Kwon et al. | .................. 33/356 |
| 7,155,837 B2 | | 1/2007 | Cho | |
| 7,162,807 B2 | | 1/2007 | Choi | |
| 7,451,549 B1 | * | 11/2008 | Sodhi et al. | .................... 33/356 |
| 2003/0167121 A1 | * | 9/2003 | Ockerse et al. | ............. 701/224 |
| 2004/0017192 A1 | | 1/2004 | Clymer | |
| 2007/0106457 A1 | * | 5/2007 | Rosenberg | .................. 701/200 |

(Continued)

OTHER PUBLICATIONS

Tome, Phillip; "Improvement of Orientation Estimation in Pedestrian Navigation by Compensation of Magnetic Disturbances"; Navigation: Jl. of the Institute of Navigation; 55, #3, Fall 2008, 178.

(Continued)

*Primary Examiner*—Hal D Wachsman
(74) *Attorney, Agent, or Firm*—Fernandez & Associates, LLP

(57) ABSTRACT

The instant invention utilizes two, optionally orthogonal and optionally slightly tilted, horizontal magnetic sensors and, optionally, a 2 or 3 axis accelerometer or inclinometer to calculate a pitch, roll and tilt compensated heading. A vertical, Z, component is relatively constant compared to X and Y components, the Z component can be abstracted from the X and Y sensor when pitch and roll is applied based on Z offset measured with X or Y sensor at high tilt angles. Additional sensors tilted at various $\theta$ degrees can be added with a different angle $\alpha$ to X sensors when additional horizontal and magnetic coverage is desirable.

6 Claims, 5 Drawing Sheets

System utilizing three axis accelerometer/inclinometer to calculate pitch and roll and a two axis magnetometer with optional magnetic sensor to increase magnetic field coverage. User calibration is preformed by user request or at startup. Tilt compensated magnetic field and heading calculation is preformed based on the user calibration and the opportunistic rotation matrix.

U.S. PATENT DOCUMENTS

2008/0091372 A1* 4/2008 Sato et al. .................. 702/92
2009/0012733 A1* 1/2009 Yamada et al. ............. 702/92

OTHER PUBLICATIONS

Cho, S.Y. and Park, C.G. "Tilt compensation algorithm for 2-axis magnetic compass." Electronics Letters, vol. 39, No. 22 (Oct. 30, 2003).

Cho, S.Y. and Park, C.G. "A Calibration Technique for a Two-Axis Magnetic Compass in Telematics Devices." ETRI Journal, vol. 27, No. 3 (Jun. 2005), pp. 280-288.

Caruso, Michael J.; "Applications of Magnetic Sensors for Low Cost Compass Systems"; Honeywell, SSEC; www.ssec.honeywell.com/magnetic/datasheets/lowcost.pdf [Apr. 26, 2010].

* cited by examiner

Figure 1:
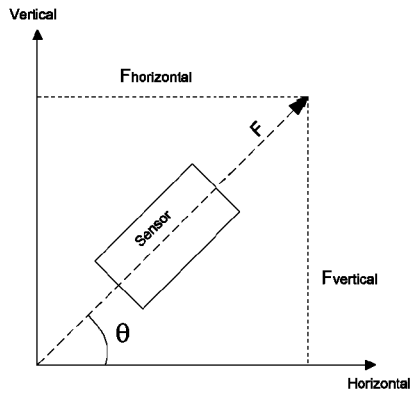

Figure 1. A non-orthogonal sensor tilted with an angle θ in the vertical direction.

Figure 2:
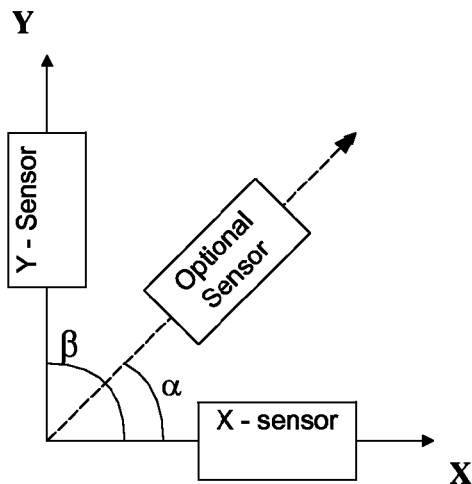

Figure 2. A non-orthogonal sensor mounted with an angle α in the horizontal plane.

Figure 3a

Typical Heading Error vs. pitch and roll up to 70 degrees. Figure 3a displays the unit pitch in degrees. Heading error is calculated using opportunistic rotation matrix.

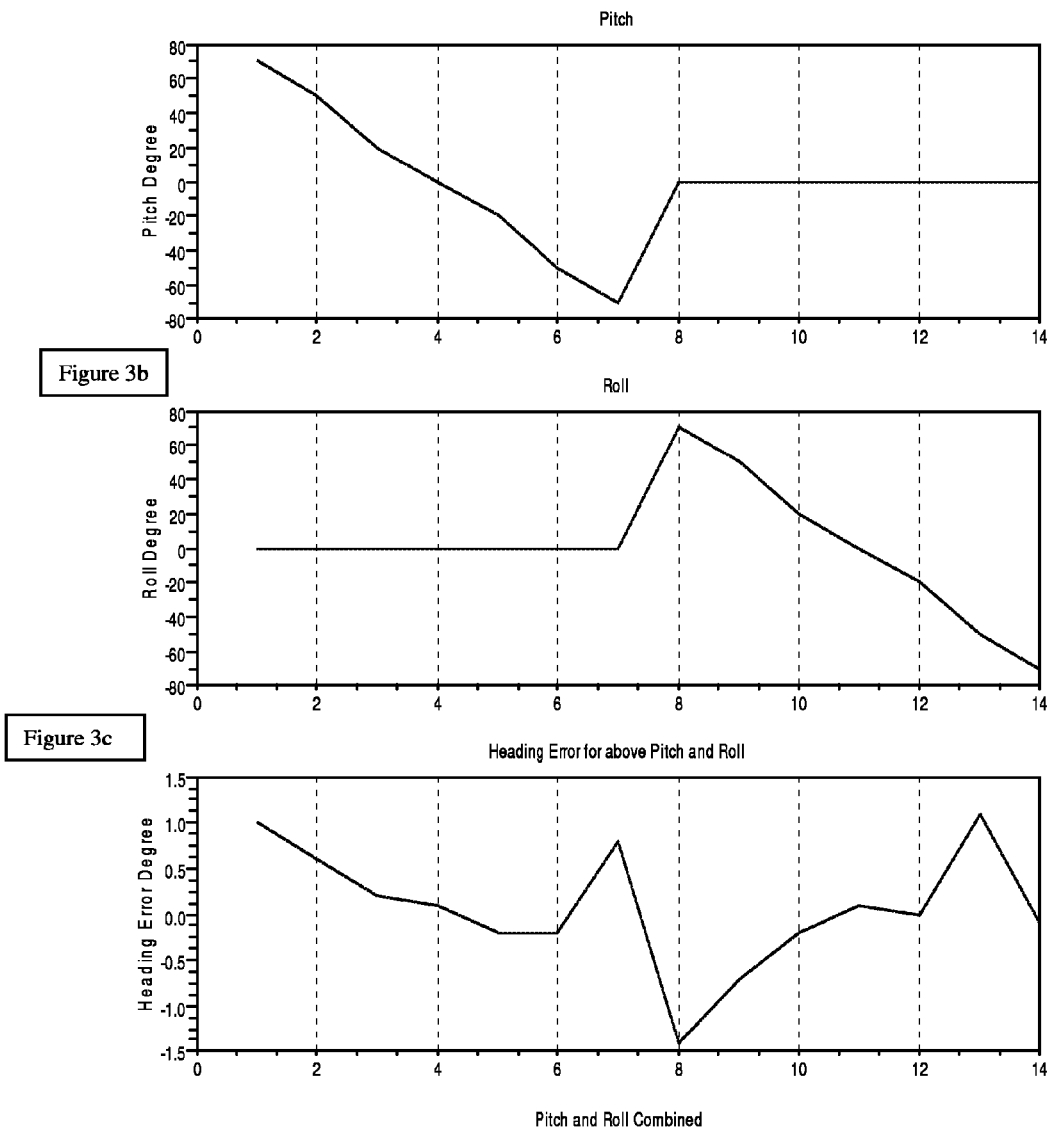

Figure 3b displays the unit roll in degrees.

Figure 3c displays typical heading error when varying pitch (±70 degrees) while keeping roll constant and varying roll (±70 degrees) while keeping pitch constant.

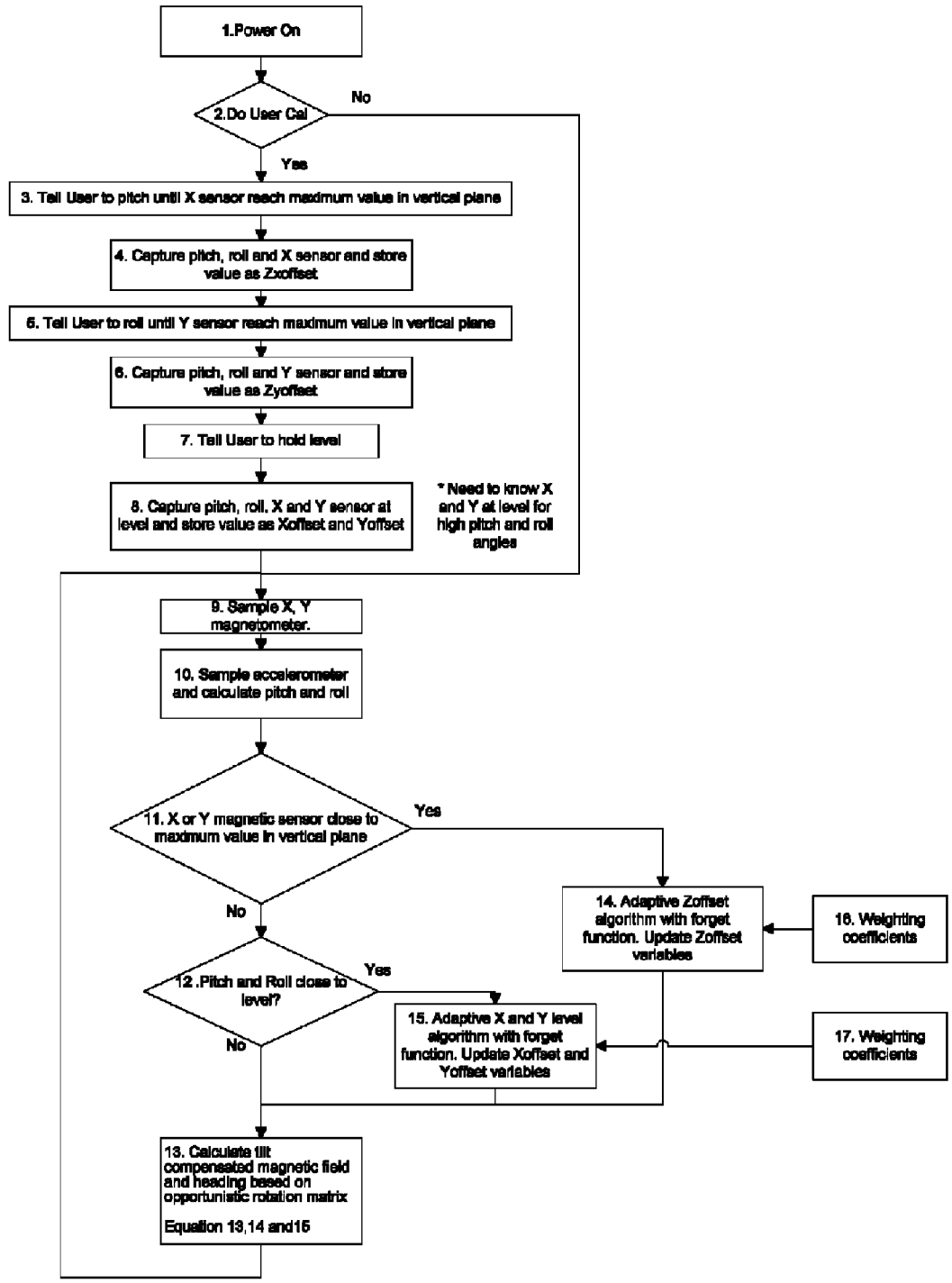

Figure 5a System Architecture of one embodiment

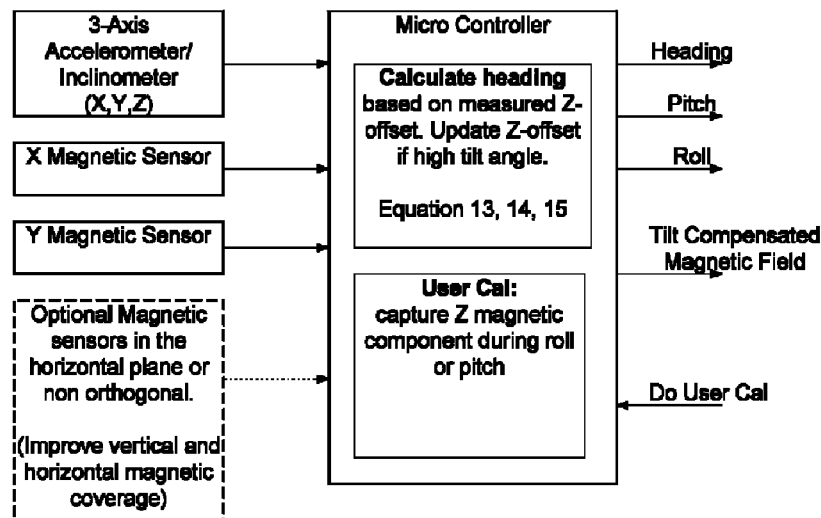

System utilizing three axis accelerometer/inclinometer to calculate pitch and roll and a two axis magnetometer with optional magnetic sensor to increase magnetic field coverage. User calibration is preformed by user request or at startup. Tilt compensated magnetic field and heading calculation is preformed based on the user calibration and the opportunistic rotation matrix.

Figure 5b System Architecture of an embodiment:

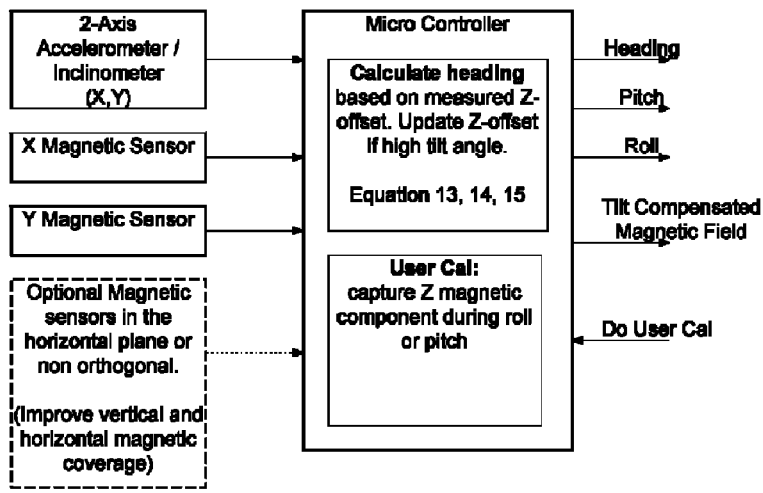

System utilizing two axis accelerometer/inclinometer to calculate pitch and roll and a two axis magnetometer.

MAGNETIC TILT COMPENSATED HEADING COMPASS WITH ADAPTIVE ZOFFSET

PRIORITY

Applicant claims priority from U.S. Provisional application Ser. No. 60/956,907 filed on Aug. 20, 2007.

CROSS-REFERENCE TO RELATED APPLICATIONS

The present invention is related in part to U.S. Pat. No. 4,851,775, U.S. Pat. No. 5,239,264, U.S. Pat. No. 5,381,603, U.S. Pat. No. 6,243,660, U.S. Pat. No. 6,549,145, U.S. Pat. No. 7,451,549, filed on Aug. 9, 2006 and U.S. Provisional application Ser. No. 60/956,907 filed on Aug. 20, 2007, all held by the same assignee. Disclosure from these patents and applications is incorporated by reference herein in their entirety.

BACKGROUND OF THE INVENTION

1. Field of the Invention

The invention relates generally to the determination of orientation heading through sensing Earth's magnetic field, and more particularly to a method and an apparatus to correct compass magnetic heading indications.

2. Description of Related Art

U.S. Pat. No. 5,525,901 describes a sensor system for monitoring and measuring angular position in two or three axes; the patent teaches how to measure angular position in three axes with two orthogonal magnetoresistive sensors and three amplifiers and an external biasing magnetic field. Currently Clymer Technologies offers a product, Terrella6™, a heading and motion sensor capable of determining roll, pitch, yaw, translational accelerations, angular rates, and compass heading; it is reportedly a sealed device containing no moving parts and has interference detection to reduce ferrous metal disturbances. U.S. Pat. No. 6,836,971 discloses a system for using a 2-axis magnetic sensor for a 3-axis compass solution using a stored value of the earth's magnetic field applicable to a geographic region. U.S. Pat. No. 7,069,663 discloses an apparatus and method for calibrating azimuth of a mobile device utilizing a calibration parameter. U.S. Pat. No. 7,162,807 discloses a geomagnetic sensor supporting a dip angle detection function with orthogonal fluxgate sensors and orthogonal acceleration sensors.

As used herein magnetic field sensor technologies include nuclear precession, optically pumped, and fiber-optic magnetometers. The magnetic range for the medium field sensors lends itself well to using the Earth's magnetic field. Several ways to use the Earth's field are to determine compass headings for navigation, detect anomalies in it for vehicle detection, and measure a derivative of the change in field to determine yaw rate. Fluxgate magnetometers are the most widely used sensor for compass navigation systems. Fluxgate sensors have also been used for geophysical prospecting and airborne magnetic field mapping. The most common type of fluxgate magnetometer is called the second harmonic device. This device involves two coils, a primary and a secondary, wrapped around a common high-permeability ferromagnetic core. A way of looking at the fluxgate operating principle is to sense the ease, or resistance, of saturating the core caused by the change in its magnetic flux. The difference is due to the external magnetic field. Fluxgate magnetometers can sense signal in the tens of micro-gauss range. Fluxgates can measure both magnitude and direction of static magnetic fields. A magnetoinductive magnetometer comprises a sensor with a single winding coil on a ferromagnetic core that changes permeability within the Earth's field. The sense coil is the inductance element in a L/R relaxation oscillator. The frequency of the oscillator is proportional to the field being measured. A static dc current is used to bias the coil in a linear region of operation. The observed frequency shift can be as much as 100% as the sensor is rotated 90 degrees from the applied magnetic field. The oscillator frequency can be monitored by a microprocessor's capture/compare port to determine field values. William Thompson first observed the magnetoresistive effect in ferromagnetic metals in 1856. Magnetoresistive (MR) sensors come in a variety of shapes and form; common applications include disk drive heads, automotive wheel speed and crankshaft sensing, compass navigation, vehicle detection, current sensing, and many others. An anisotropic magnetoresistive (AMR) sensor is one type that lends itself well to the Earth's field sensing range. AMR sensors can sense dc static fields as well as the strength and direction of the field. Frequently, this sensor is made of a nickel-iron thin film deposited on a silicon wafer and is patterned as a resistive strip. The properties of the AMR thin film cause it to change resistance by 2-3% in the presence of a magnetic field. The reaction of the magnetoresistive effect is very fast and not limited by coils or oscillating frequencies.

The Earth's magnetic field intensity is about 0.5 to 0.6 gauss and has a component parallel to the Earth's surface that always point toward magnetic north. This is the basis for all magnetic compasses. The Earth's magnetic field can be approximated with a dipole model; the Earth's magnetic field points down toward north in the northern hemisphere, is horizontal and pointing north at the equator, and point up toward north in the southern hemisphere. In all cases, the direction of the Earth's field is always pointing to magnetic north. It is the components of this field that are parallel to the Earth's surface that are used to determine compass direction. The vertical portion of the Earth's magnetic field is frequently ignored.

Most often compasses are not confined to a flat and level plane; they are often hand held, attached to an aircraft, or on a vehicle in an uneven terrain. This makes it more difficult to determine an azimuth, or heading direction, since a compass is not always horizontal to the Earth's surface. Errors introduced by tilt angles can be quite large depending on the amount of the Dip angle. A typical method for correcting a compass tilt is to use an inclinometer, or tilt sensor, to determine the roll and pitch angles. The terms roll and pitch are commonly used in aviation: roll refers to the rotation around the X, or forward direction, and pitch refers to the rotation around the y, or left-right, direction. Liquid filled tilt sensors, resembling a glass "thimble", use electrodes to monitor the fluid movement as the sensor changes angles. Solid state accelerometer tilt sensors are available that measure the Earth's gravitational field by means of an electromechanical circuit or MEMS based accelerometers are also available. The output of these devices can be an electrical signal equivalent to the angle of tilt.

To achieve a one degree accurate compass requires a magnetic sensor that can reliably resolve angular changes to 0.1 degrees. Magnetic sensors must also exhibit low hysteresis (<0.05% FS), a high degree of linearity (<0.5% FS error) and be repeatable. Magnetic fields in the X and Y plane are typically in the 200 to 300 milli-gauss range—more at the equator, less at the poles. To resolve a 0.18 degree change in a 200 milli-gauss field requires a magnetic sensitivity of better than 0.35 milli-gauss. To compensate a compass for tilt, knowing the roll and pitch is required as well as other factors. Historically, magnetometers required all magnetic axes (X, Y, Z) so that the Earth's field is easily fully rotated back to a horizontal orientation. A compass has roll (r) and pitch (p) tilt angles referenced to the right and forward level directions of an observer or vehicle. The X, Y, and Z magnetic readings are transformed back to a horizontal plane (XH, YH) by applying rotational equations. Once the X and Y magnetic readings are in a horizontal plane, equations can be used to determine an azimuth. A block diagram for a tilt compensated compass of the instant invention is shown in FIG. 4. After an azimuth is determined, a declination correction is applied to find true north according to the geographic region of operation.

BRIEF SUMMARY OF THE INVENTION

The instant invention, a tilt compensated magnetic compass, in one embodiment, comprises at least two, optionally orthogonal, magnetic sensors aligned in a selected plane; optionally at least one of the at least two magnetic sensors are tilted slightly out of a selected, optionally horizontal, plane for increased magnetic field coverage. For tilt sensing, a two or three axis accelerometer or inclinometer is used to calculate pitch, roll and tilt compensated heading. Since the vertical magnetic component (Z) is relatively constant compared to X and Y components, the Z component can be calculated from the X and Y sensor when pitch and/or roll are applied. The instant invention is enabled with as few as two magnetic sensors and two accelerometers, decreasing cost, size and weight and improving speed.

The instant invention, in some embodiments, utilizes two, optionally orthogonal and optionally slightly tilted, horizontal magnetic sensors and, optionally, a 2 or 3 axis accelerometer or inclinometer to calculate a pitch, roll and tilt compensated heading. A vertical, Z, component is relatively constant compared to X and Y components, the Z component can be abstracted from the X and Y sensor when pitch and roll is applied based on Z offset measured with X or Y sensor at high tilt angles. To improve horizontal and vertical magnetic coverage additional sensors tilted θ degrees can be added with a different angle α to X sensor.

BRIEF DESCRIPTION OF THE SEVERAL VIEWS OF THE DRAWING(S)

Figure 6:
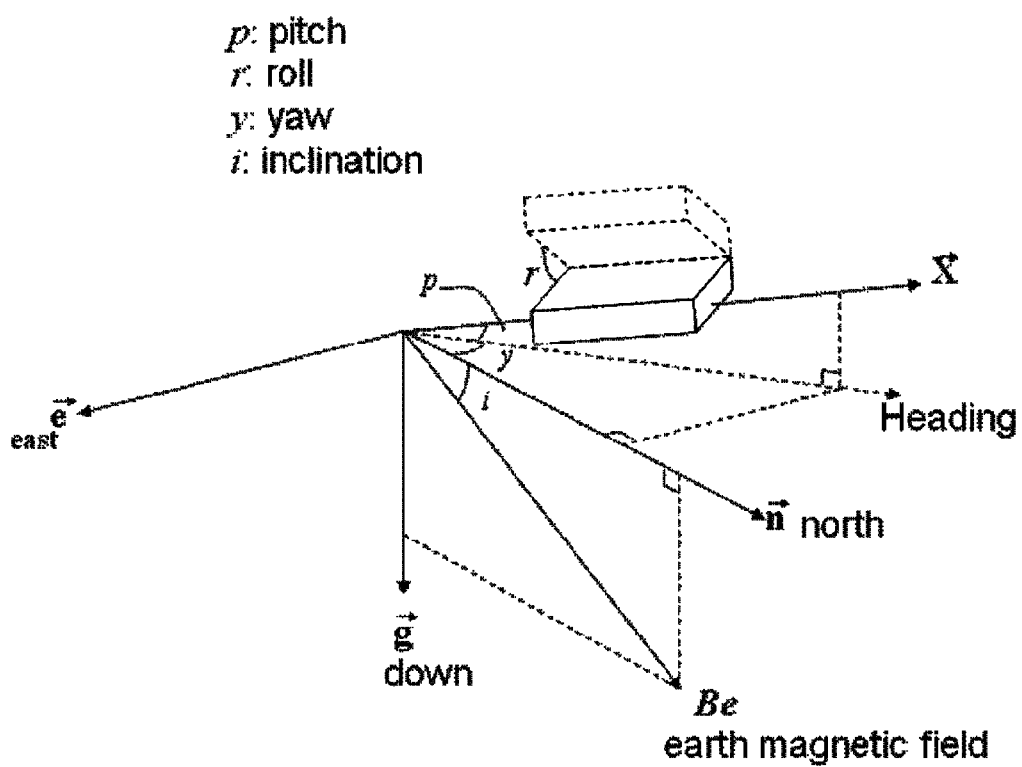

FIG. 1 shows a tilted, non-orthogonal magnetic sensor.
FIG. 2 shows a X and Y sensor with an optional $3^{rd}$ sensor.
FIG. 3a, 3b, 3c show typical heading error versus roll.
FIG. 4 shows a method for calculating a heading.
FIG. 5a is a system architecture of one embodiment.
FIG. 5b is a system architecture of another embodiment.
FIG. 6 illustrates orientation terms.

SYMBOLS

Be Undistorted Earth's magnetic field vector.
Bm Magnetic field vector as measured by a magnetometer.
$\vec{g}$ Down vector in the earth coordinate system, pointed to the center of the earth.
$\vec{n}$ North direction vector of earth coordinate system, pointed in the direction of the magnetic North Pole in the local horizontal plane.
$\vec{e}$ East direction vector of earth's coordinate system, pointed in an easterly direction in the local horizontal plane.
i Inclination or dip angle, referenced to earth
p Pitch angle
r Roll angle
y yaw angle or heading angle
X compass orientation of magnetic component in X direction
Y compass orientation of magnetic component in Y direction
Z compass orientation of magnetic component in Z direction
X" tilt compensated magnetic field vector in the earth frame of reference.
Y" tilt compensated magnetic field vector in the earth frame of reference.
Z" tilt compensated magnetic field vector in the earth frame of reference.
β included angle between X sensor and Y sensor.
Xoffset Magnetic component in X direction when level, pitch and roll near zero.
Yoffset Magnetic component in Y direction when level, pitch and roll near zero.
Zxoffset Magnetic component in Z direction with pitch near 90 degrees measured by X sensor.
Zyoffset Magnetic component in Z direction with roll near 90 degrees measured by Y sensor.
$g_x$ X-axis gravity
$g_y$ Y-axis gravity
$g_z$ Z-axis gravity
WeightingNew The weight of the new value in adaptive forget algorithm.
WeightingOld The weight of the old value in adaptive forget algorithm.
Distortion Magnetic magnitude distortion value.
λ A parameter to adjust a forgetting factor of an algorithm.
θ, tilt angle, absolute, in a ±Z direction from the plane defined by the pitch, p, and roll, r, angles
α optional sensor angle, absolute, between X and Y sensors

DETAILED DESCRIPTION OF THE INVENTION

FIG. 1 illustrates one embodiment of a non-orthogonal sensor mounted to a device; the sensor is tilted with an angle θ in the vertical direction; not shown is angle, β, between X sensor and axis Y sensor; β may be 90° or not. Applying a tilt to the sensor enables the capabilities of sensing the vertical field when in the horizontal plane. The horizontal and vertical components of the magnetic field for a tilted sensor are given in equations 1 and 2:

$$F_{vertical} = F * \sin(\theta) \tag{1}$$

$$F_{horizontal} = F * \cos(\theta) \tag{2}$$

FIG. 2 illustrates another embodiment of a non-orthogonal sensor mounted to a device. A sensor is mounted with an angle α in the horizontal plane. Additional horizontal sensors may be added to a X-Y plane with varying degrees of tilt, ±α, to increases the horizontal field component or achieve higher resolution or other features.

To improve horizontal and vertical magnetic coverage at least two magnetic field sensors can be placed advantageously: a) horizontally, a sensor with a different angle α to X sensor (FIG. 2); b) slightly tilted θ degree sensor (FIG. 1) with a rotation of a degrees to X sensor (FIG. 2).

FIGS. 3a, 3b and 3c shows system/device typical heading error versus pitch and roll; FIG. 3a displays the unit pitch in degrees. Heading error is calculated using opportunistic rotation matrix. FIG. 3b displays the unit roll in degrees. FIG. 3c displays typical heading error when varying pitch (±70 degrees) while keeping roll constant and varying roll (±70 degrees) while keeping pitch constant.

During system/device calibration or normal operating mode by a user of a tilt compensated magnetic compass the following operations are executed.

1) When a user applies a pitch motion of less than ±90 degrees the Z component is captured by a X sensor and used as an offset to calculate the Z component in the X sensor.

2) When the user applies a roll motion of less than ±90 degrees the Z component is captured by a Y sensor and used as an offset to calculate the Z component in the Y sensor.

3) When pitch and roll of less than ±90 degrees is applied by a user a Z component offset is captured and adaptively modified as the user's motions may dictate; see Eqn. (12) below. In one embodiment the Z component of a X or Y sensor is sensed at its maximum value during a pitch or roll motion while either the pitch or roll component is zero.

Normal Three Axis Rotation Matrix for Pitch and Roll with Three Sensors:

$$\text{Rotation about X (roll)} \begin{bmatrix} x' \\ y' \\ Z' \end{bmatrix} = \begin{bmatrix} 1 & 0 & 0 \\ 0 & \cos(r) & \sin(r) \\ 0 & -\sin(r) & \cos(r) \end{bmatrix} \begin{bmatrix} x \\ y \\ z \end{bmatrix} \quad (3)$$

$$\text{Rotation about Y (pitch)} \begin{bmatrix} x' \\ y' \\ Z' \end{bmatrix} = \begin{bmatrix} \cos(p) & 0 & -\sin(p) \\ 0 & 1 & 0 \\ \sin(p) & 0 & \cos(p) \end{bmatrix} \begin{bmatrix} x \\ y \\ z \end{bmatrix} \quad (4)$$

Equation to Find Z Component for Roll, Based on Zy Offset Measured at Roll of Less than +90 or −90 Degree:

$$z = \frac{Z_{Yoffset} + \sin(r)y}{\cos(r)} \quad (5)$$

Equation to Find Z Component for Pitch, Based on Zx Offset Measured at Pitch of Less than +90 or −90 Degree:

$$z = \frac{Z_{Xoffset} - \sin(p)x}{\cos(p)} \quad (6)$$

Using only X and Y sensors, two sensor rotation matrixes can be rewritten to:

$$\text{Rotation about X (roll)} \begin{bmatrix} x' \\ y' \\ Z' \end{bmatrix} = \quad (7)$$

$$\begin{bmatrix} 1 & 0 & 0 \\ 0 & \cos(r) & \sin(r) \\ 0 & -\sin(r) & \cos(r) \end{bmatrix} \begin{bmatrix} x \\ y \\ \frac{Z_{Yoffset} + \sin(r)y}{\cos(r)} \end{bmatrix}$$

$$\text{Rotation about Y (pitch)} \begin{bmatrix} x' \\ y' \\ Z' \end{bmatrix} = \quad (8)$$

$$\begin{bmatrix} \cos(p) & 0 & -\sin(p) \\ 0 & 1 & 0 \\ \sin(p) & 0 & \cos(p) \end{bmatrix} \begin{bmatrix} x \\ y \\ \frac{Z_{Xoffset} - \sin(p)x}{\cos(p)} \end{bmatrix}$$

An Opportunistic Roll Rotation Matrix and an Opportunistic Pitch Rotation Matrix is defined as the following based on the above equations using only X and Y sensors:

3-Axis Accelerometer Pitch and Roll Calculations gx=X-axis gravity gy=Y-axis gravity gz=Z-axis gravity $$\text{pitch} = \text{ATAN2}\left(\frac{g_x}{\sqrt{g_y^2 + g_z^2}}\right) \quad (9)$$

$$\text{roll} = \text{ATAN2}\left(\frac{g_y}{\sqrt{g_x^2 + g_z^2}}\right) \quad (10)$$

2-Axis Accelerometer Pitch and Roll Calculations gx=X-axis gravity gy=Y-axis gravity pitch=ARCSIN($g_x$) \quad (11)

roll=ARCSIN($g_y$) \quad (12)

Rotation about X, Opportunistic Roll Rotation Matrix:

$$\begin{bmatrix} X' \\ Y' \\ Z' \end{bmatrix} = \begin{bmatrix} 1 & 0 & 0 \\ 0 & \cos(r) + \frac{\sin(r)^{\wedge}2}{\cos(r)} & \frac{\sin(r)}{\cos(r)} \\ 0 & 0 & 1 \end{bmatrix} \begin{bmatrix} X \\ Y \\ Z_{Yoffset} \end{bmatrix} \quad (13)$$

Rotation about Y, Opportunistic Pitch Rotation Matrix:

$$\begin{bmatrix} X'' \\ Y'' \\ Z'' \end{bmatrix} = \begin{bmatrix} \cos(p) + \frac{\sin(p)^{\wedge}2}{\cos(p)} & 0 & -\frac{\sin(p)}{\cos(p)} \\ 0 & 1 & 0 \\ 0 & 0 & 1 \end{bmatrix} \begin{bmatrix} X' \\ Y' \\ Z_{Xoffset} \end{bmatrix} \quad (14)$$

In equation 14, X", Y", Z" are the tilt compensated magnetic field vectors in the earth frame of reference.

Tilt Compensated Heading Calculation:

$$\text{Heading} = \text{ATAN2}\left(\frac{Y''}{X''}\right) \quad (15)$$

In one embodiment a tilt compensated magnetic compass comprises at least a two-axis accelerometer or inclinometer and at least two, optionally orthogonal, magnetic field sensors, such that the compass calculates a tilt compensated heading. One advantage of this embodiment is that the cost of a Z sensor and Z-axis ASIC driver circuit is eliminated. The addition of more than two sensors in a horizontal and/or a vertical plane increases the X, Y and Z magnetic component coverage and signal in all three planes without adding to an increase in size in the Z direction.

FIG. 4 shows steps in a method to calculate a tilt compensation for a tilt compensated magnetic compass; in one embodiment the steps are:

[1] Power is applied to sensors and microcontroller.

[2] Microcontroller initializes, and performs a check if previous magnetometer, accelerometer and Zoffset/XYoffset values exist in memory. If true, skip user calibration, else perform user calibration. User calibration may also be triggered externally by user.

[3] Microcontroller instructs user to level roll, r≈0, and apply a pitch until maximum reach; this can be done through a display, LED or audible.

[4] When X-sensor reaches about a maximum value, capture X-sensor, pitch and roll value and store as Zxoffset in memory.

[5] Microcontroller instructs user to level pitch, p≈0, and apply a roll until maximum reach; this can be done through a display, LED or audible.

[6] When Y-sensor reaches maximum value, capture Y-sensor, pitch and roll value and store as Zyoffset in memory.

[7] Microcontroller instructs user to level pitch and level roll; this can be done through a display, LED or audible.

[8] When device is about level, capture X-sensor, Y-sensor, pitch and roll value and store as Xoffset and Yoffset in memory. User calibration is now done and normal sampling mode is executed.

[9] Sample and store in memory X and Y magnetometer and any optional magnetic sensors if present.

[10] Sample and store in memory 2-axis accelerometer/inclinometer and calculate pitch and roll.

[11] Check if X or Y magnetic sensor is close to maximum value in vertical plane. Pitch or roll approximately 90 degrees, (approximately ±10° of 90 degrees). When true move to step 14 and perform adaptive Zoffset algorithm (Eqns. 16 and 17). If False move to step 12

[12] Check if pitch and roll is near level (approximately ±10° of 0 degrees). If true perform step 15, adaptive X and Y level algorithm (Eqns. 18 and 19).

[13] Calculate heading based on opportunistic rotation matrix. At this step Zoffset and X, Y level is up to date. After calculation repeat from step 9.

[14] When X magnetic sensor is near a maximum value, perform adaptive Zxoffset algorithm and calculate a new Zxoffset value. When Y magnetic sensor is near a maximum value, perform adaptive Zyoffset algorithm and calculate a new Zyoffset value

[15] When pitch and roll is near zero value, perform adaptive Xoffset and Yoffset algorithm and calculate new Xoffset and Yoffset values.

[16] Weighting coefficients used for step 14; as per Eqn. 16 and 17.

[17] Weighting coefficients used for step 15; as per Eqn. 18 and 19.

User calibration comprises Steps 2 to 8, done to obtain an accurate heading initially. Optionally, user calibration may be skipped and only steps 9 to 17 performed; in this embodiment heading accuracy improves as the user continues to operates the device and applies pitch and roll close to ±90 degrees. Note that wherein a magnetic sensor is near or close to 0 or 90 degrees a calculated compass heading error is degraded the further away from actual 0 or 90 degrees a calibration or update is done. Approximately ±10° of 0 or 90 degrees is taught as a reasonable operating range; higher deviations are possible in some environments.

In one embodiment a method to calculate a tilt compensated heading for a tilt compensated magnetic compass comprises the following steps:

[1] sense and store at least first and second magnetometer readings;

[2] sense and store at least a 1-axis accelerometer reading;

[3] calculate pitch and roll with two sensor rotation matrixes;

[4] perform adaptive Zoffset algorithm when X or Y magnetic sensor is within about five degrees of 90;

[5] perform adaptive X and Y level algorithm when pitch and roll is within about five degrees of 0; and

[6] calculate heading with an opportunistic rotation matrix.

In one embodiment a method to calculate a tilt compensated heading comprises additional steps, such as:

[1] apply a pitch until a maximum magnetic sensor reading is sensed wherein roll is about zero;

[2] store a Zxoffset reading;

[3] apply a roll until a maximum magnetic sensor reading is sensed wherein pitch is about zero; and

[4] store a Zyoffset reading.

The embodiments for a tilt compensated magnetic compass following the methods above comprise at least two magnetic sensors and two accelerometers; additional magnetic sensors and/or accelerometers or inclinometers may be added as an application requires. Optionally, a tilt compensated magnetic compass may communicate to a user or other device through one or more means chosen from a group comprising wireless, WiFi, radio frequency, RF, electrically, auditory, optically, tactilely, and visually. A tilt compensated magnetic compass may be powered through one or more means chosen from a group comprising battery, energy scavenger, energy cell, RF, microwave, and electrical. A tilt compensated magnetic compass may comprise one or more processors, ASIC's, memory chips and other integrated circuits as required to function as a means for processing sensor signals and calculating a tilt compensated magnetic compass heading or azimuth comprising an adaptive Zoffset algorithm with forget function.

In some embodiments a forget or forgetting function or factor is based on updated input data required to determine an undistorted Earth's magnetic field, as a combination of the previous estimate and new processed observations. An algorithm may adapt more or less quickly to a changing magnetic environment by way of an exponentially weighted "Forget Factor", $\lambda$, of the algorithm. Setting a Forgetting Factor parameter close to 1.0 makes the algorithm resistant to signal noise by accepting new data less; setting it to 0.8 causes the algorithm to accept the new data more, and therefore causes the estimated parameters to be more susceptible to noise. In this way, the algorithm behaves similar to a typical least squares algorithm, and adapts to a slowly changing magnetic environment at a rate settable by a manufacturer or, optionally, a user. A detailed discussion is found in U.S. application Ser. No. 11/502,593, filed on Aug. 9, 2006 and now U.S. Pat. No. 7,451,549, and included herein in its entirety by reference. Optionally, a "WeightingNew" or "WeightingOld" may be used as a forget or forgetting function or factor, λ.

In one embodiment with an X-Z(tilt) and/or a Y-Z(tilt) from a single sensor then when measuring pitch of a compass, X and Z magnetic component is measured from the X-Z(tilt) sensor based on the $Z_{xoffset}$ captured during a calibration step. When measuring roll of a compass, Y and Z magnetic component can be measured from the Y-Z(tilt) sensor based on the $Z_{yoffset}$ captured during a calibration step. In an alternative embodiment wherein a "opportunistic Z sensor device" comprising a X and/or Y sensor is positioned at a high tilt angle, defined as greater than 45° and up to ±90 degrees, an X and/or Y sensor can function as a Z-sensor, measuring the Z component very accurately. By using equations 13 and/or 14, Z-offset coefficients are calculated, enabling a heading to be calculated from Eq. (15). In an alternative embodiment a X and/or Y sensor is tilted, θ, at least two degrees and less than 88 degrees, absolute, in a ±Z direction.

In one embodiment magnetic field vectors X", Y" and Z" are calculated based on readings from a magnetic tilt compensated magnetometer comprising at least a first and second magnetic field sensor; and at least a first and second accelerometer; these field vectors X", Y" and Z", in the earth frame of reference, are calculated by an equation of the form:

$$\begin{bmatrix} X'' \\ Y'' \\ Z'' \end{bmatrix} = \begin{bmatrix} \cos(p) + \frac{\sin(p)^2}{\cos(p)} & 0 & -\frac{\sin(p)}{\cos(p)} \\ 0 & 1 & 0 \\ 0 & 0 & 1 \end{bmatrix} \begin{bmatrix} X' \\ Y' \\ Z_{Xoffset} \end{bmatrix}$$

System (Z Sensor Device) Tilt Versus Sensor (X and/or Y) Tilt.

In one embodiment a Z-offset coefficient is dynamic and changes depending on magnetic environment and user orientation. A calculated Z-offset is changing continuously in this embodiment; a Z-offset coefficient is measured at high tilt as the Z component is reaching its maximum or minimum. A new Z-offset is calculated based on a new measurement and previous measurements. Over time a Z-offset coefficient adaptively changes to a changing Z component; in one embodiment a user selects weighting factors for adaptive changes.

Adaptive changes are made by setting different Weighting-New and WeightingOld values the new offset will consist of the ratio of the two weights. Example, WeightingOld≈0.8 and WeightingNew≈0.2 then the new offset will consist of 80% old Zoffset and 20% new Zoffset. Over time when there is a unit response, the Zoffset will adapt to the new value.

Adaptive Zoffset Algorithm with Forget Function:

$Zx$offset=$X$*WeightingNew+$Zx$offset*WeightingOld (16)

$Zy$offset=$Y$*WeightingNew+$Zy$offset*WeightingOld (17)

Algorithm Used for X and Y Offset Algorithm with Forget Function at Level $X$offset=$X$*WeightingNew+$X$offset*WeightingOld (18)

$Y$offset=$Y$*WeightingNew+$Y$offset*WeightingOld (19)

Xoffset and Yoffset are used as a magnetic distortion detector. When the magnitude of X", Y" and Z" is different then the magnitude of Xoffset and Yoffset, a magnetic distortion is present.

Magnitude Distortion Equation:

$$\text{Distortion} = \sqrt{X\text{offset}^2 + Y\text{offset}^2} - \sqrt{X''^2 + Y''^2 + Z''^2} \qquad (20)$$

when Distortion is above a threshold level then a user alert and/or a calibration may be initiated.

In one embodiment system architecture is shown in FIG. 5a; a system utilizes three axis accelerometer/inclinometer to calculate pitch and roll and a two axis magnetometer with optional magnetic sensor to increase magnetic field coverage. User calibration is preformed by user request or at startup. Heading calculation is preformed based on the user calibration and the opportunistic rotation matrix. Optionally, only two axis accelerometer is utilized, as shown in FIG. 5b; a "Z axis device" comprises a two axis accelerometer/inclinometer to calculate pitch and roll and a two axis magnetometer with optional magnetic sensor to increase magnetic field coverage. Optional user calibration is preformed by user request or at startup. Heading calculation is preformed based on a user calibration and an opportunistic rotation matrix or simply an opportunistic rotation matrix in absence of a user calibration.

User calibration may be facilitated by a "Z axis device" through a display or LED's or audible messages; a user is requested to sequence a "Z axis device" through various motions of desired rolls and pitches and orientations such that a local magnetic field is adequately sensed and/or mapped and the internal sensors are sensed in the requested motions. In the absence of a user performing a calibration a "Z axis device" accumulates data based on whatever motions a user may be using; over time and motions, calculated heading accuracy improves.

In one embodiment only two sensors are sampled enabling a higher sampling rate or lower average power. If the time it takes to sample the third sensor is used to idle, lower power is possible. If the time it takes to sample the third sensor is used to sample one of the two sensors, higher speed is possible.

The instant invention may be a subsystem in a more complex navigation system comprising GPS, sonar systems, laser signals, or other means known to one knowledgeable in the field. When a GPS apparatus is present the longitude and latitude data it provides may be combined with tables and/or algorithms to calculate the declination angle for that spot on the globe. For tilt sensing, a 2 or 3 axis accelerometer or Inclinometer is used to calculate pitch, roll and tilt compensated heading.

FIG. 6 shows the relative orientation of various axes and angles as described herein.

In one embodiment a magnetic tilt compensated heading compass system comprises a first magnetic field sensor wherein the first magnetic field sensor is tilted in a ±Z axis direction of angle θ such that 2≦θ≦88 degrees, absolute; a means for communicating a magnetic field sensor reading, and a means for calculating a tilt compensated heading wherein the tilt compensated heading comprises a Zoffset. In some embodiments a means for calculating is apart from a magnetic tilt compensated heading compass; a user may have a very small portable compass which communicates with a remote computer or other computing or processing or calculating means. In some embodiments a Zoffset algorithm comprises a Zxoffset and a Zyoffset with forget function wherein $Zx$offset=$X$*WeightingNew+$Zx$offset*WeightingOld (16)

$$Zy\text{offset}=Y*\text{WeightingNew}+Zy\text{offset}*\text{WeightingOld}. \quad (17)$$

As used herein "a first and second magnetic field sensor" and "a first and second accelerometer" refer to a single axis sensor. Two, three or higher axis embodiments of these sensors are within the scope of the instant invention. As one knowledgeable in the art knows solid-state and/or MEMS devices integrate one or more axial sensors in a single structure or package. The instant invention distinguishes the axial alignment of a magnetic or gravitational sensing device comprising two or more axial sensors independent of the level of integration.

In one embodiment a magnetic tilt compensated heading compass employs an alternative algorithm to calculate Zoffset. The alternative algorithm comprises the steps:

[1] Sense two sets of magnetometer and inclinometer readings, first and second readings for each of two magnetic field sensors and two inclination sensors. Each reading comprises magnetometer measurements on at least two magnetic field sensors, and inclinometer measurements on at least two inclination sensors. First and second reading may be performed in any orientation as long as they are not at the same inclination angle i or such that i(1) is different from i(2).

[2] Calculate Zoffset based on the inclination change between first reading and second reading, and the measured magnetic field change between first reading and second reading.

[3] Calculate heading with at least a two axis opportunistic rotation matrix.

In one embodiment X", Y" and Z", tilt compensated magnetic field vectors in the earth frame of reference are calculated with readings from a magnetic tilt compensated magnetometer comprising at least a first and second magnetic field sensor and at least a first and second accelerometer; wherein X", Y" and Z" are calculated by an equation of the form:

$$\begin{bmatrix} X'' \\ Y'' \\ Z'' \end{bmatrix} = \begin{bmatrix} \cos(p) + \frac{\sin(p)^2}{\cos(p)} & 0 & -\frac{\sin(p)}{\cos(p)} \\ 0 & 1 & 0 \\ 0 & 0 & 1 \end{bmatrix} \begin{bmatrix} X' \\ Y' \\ Z_{Xoffset} \end{bmatrix}.$$

Optionally, a magnetic tilt compensated magnetometer may have a first magnetic field sensor tilted in a ±Z axis direction of angle θ such that 2≦θ≦88 degrees, absolute. Optionally a magnetic tilt compensated magnetometer further comprising a means for communicating a magnetic field sensor reading; and a means for calculating a Zxoffset and a Zyoffset wherein:

$$Zx\text{offset}=X*\text{WeightingNew}+Zx\text{offset}*\text{WeightingOld}$$

$$Zy\text{offset}=Y*\text{WeightingNew}+Zy\text{offset}*\text{WeightingOld}.$$

The foregoing described embodiments of the invention are provided as illustrations and descriptions. They are not intended to limit the invention to a precise form as described. In particular, it is contemplated that functional implementation of invention described herein may be implemented equivalently in hardware or various combinations of hardware and software and/or other available functional components or building blocks. Other variations and embodiments are possible in light of above teachings to one knowledgeable in the art, and it is thus intended that the scope of invention not be limited by this Detailed Description, but rather by Claims following.

What we claim are:

1. A magnetic tilt compensated heading compass comprising:
    a means for communicating with a means for calculating a tilt compensated heading;
    a first and second magnetic field sensor for acquiring magnetic field data aligned with respect to each other at an included angle β; and
    a first and second accelerometer for acquiring tilt compensation data and aligned such that the first and second accelerometer are operable with the first and second magnetic field sensors;
    wherein the magnetic tilt compensated heading compass communicates magnetic field and tilt compensation data to a means for calculating a tilt compensated heading operable to calculate a heading such that the tilt compensated [Heading] equals ATAN2{Y"/X"} wherein X" is the tilt compensated magnetic field vector in the X direction in the earth frame of reference and Y" is the tilt compensated magnetic field vector in the Y direction in the earth frame of reference and wherein at least one of said first and second magnetic field sensors has a tilt in a ±Z axis direction of angle θ wherein 2≦θ≦88 degrees, absolute.

2. A magnetic tilt compensated heading compass of claim 1 wherein said means for calculating is operable to determine a NewZoffset(n) such that:

NewZoffset(n)=Zoffset(n)*WeightingNew+Zoffset(n−1)*WeightingOld wherein Zoffset(n) contains the current first and second magnetic field sensor data and Zoffset (n−1) contains the just previous first and second magnetic field sensor data.

3. A magnetic tilt compensated heading compass comprising:
    a first magnetic field sensor wherein the first magnetic field sensor is tilted in a ±Z axis direction of angle θ such that 2≦θ≦88 degrees, absolute;
    second magnetic field sensor aligned with respect to the first magnetic field sensor at an included angle β; and
    a means for calculating a tilt compensated heading from data acquired by the first and second magnetic field sensors wherein the tilt compensated heading comprises a Zxoffset and a Zyoffset wherein Zxoffset=X*WeightingNew+Zxoffset*WeightingOld Zyoffset=Y*WeightingNew+Zyoffset*WeightingOld WeightingNew is the weight of the new value in an adaptive forget algorithm;
    WeightingOld is the weight of the old value in an adaptive forget algorithm;
    X is the compass orientation of magnetic component in X direction;
    Y is the compass orientation of magnetic component in Y direction;
    Zxoffset is the magnetic component in Z direction with pitch near 90 degrees measured by the first magnetic field sensor; and
    Zyoffset is the magnetic component in Z direction with roll near 90 degrees measured by the second magnetic field sensor.

4. A magnetic tilt compensated heading compass of claim 3 wherein said means for calculating a tilt compensated heading is remote from said first and second magnetic field sensors.

5. A magnetic tilt compensated heading compass comprising:
- a first magnetic field sensor tilted in a ±Z axis direction of angle θ such that $2 \leq \theta \leq 88$ degrees, absolute;
- a second magnetic field sensor aligned with respect to the first magnetic field sensor at an included angle β; wherein the first and second magnetic field sensors acquire magnetic field data; and
- a means for calculating a tilt compensated heading employing a Zoffset and data from the first and second magnetic field sensors such that the tilt compensated [Heading] equals A TAN 2{Y"/X"} wherein X" is the tilt compensated magnetic field vector in the X direction in the earth frame of reference and Y" is the tilt compensated magnetic field vector in the Y direction in the earth frame of reference.

6. The magnetic tilt compensated heading compass of claim 5 further comprising a Zoffset with forget function.

* * * * *